United States Patent [19]

Brown et al.

[11] 4,227,220
[45] Oct. 7, 1980

[54] TAPE RECORDING SYSTEM

[76] Inventors: Hill Brown, 1232 Rialto Ave., Sebring, Fla. 33870; Jack M. Pippin, P.O. Box 254, Altamonte Springs, Fla. 32701

[21] Appl. No.: 793,086

[22] Filed: May 2, 1977

[51] Int. Cl.² ............... G11B 5/86; G11B 15/22
[52] U.S. Cl. ................................. 360/15; 360/72.1
[58] Field of Search .............................. 360/15, 72

[56] References Cited
U.S. PATENT DOCUMENTS

| | | | |
|---|---|---|---|
| 3,426,339 | 2/1969 | Rich et al. | 360/15 |
| 3,718,906 | 2/1973 | Lightner | 360/15 |
| 3,990,710 | 11/1976 | Hughes | 360/15 |

Primary Examiner—Robert S. Tupper
Attorney, Agent, or Firm—Duckworth, Hobby, Allen & Pettis

[57] ABSTRACT

A tape reproducing and recording system for recording selected pieces from a bank of recorded material having a system for selecting desired pieces of recorded material from a bank of recorded material and a memory for storing the selections made. A scanning or retrieval system is coupled to the memory and to a tape reproducing system having the bank of recorded material coupled thereto for locating the selected pieces in the bank of recorded material and reproducing the selected pieces. A recorder then records the selected pieces in the order they were reproduced whereby recordings can be made having only preselected recorded pieces thereon.

7 Claims, 8 Drawing Figures

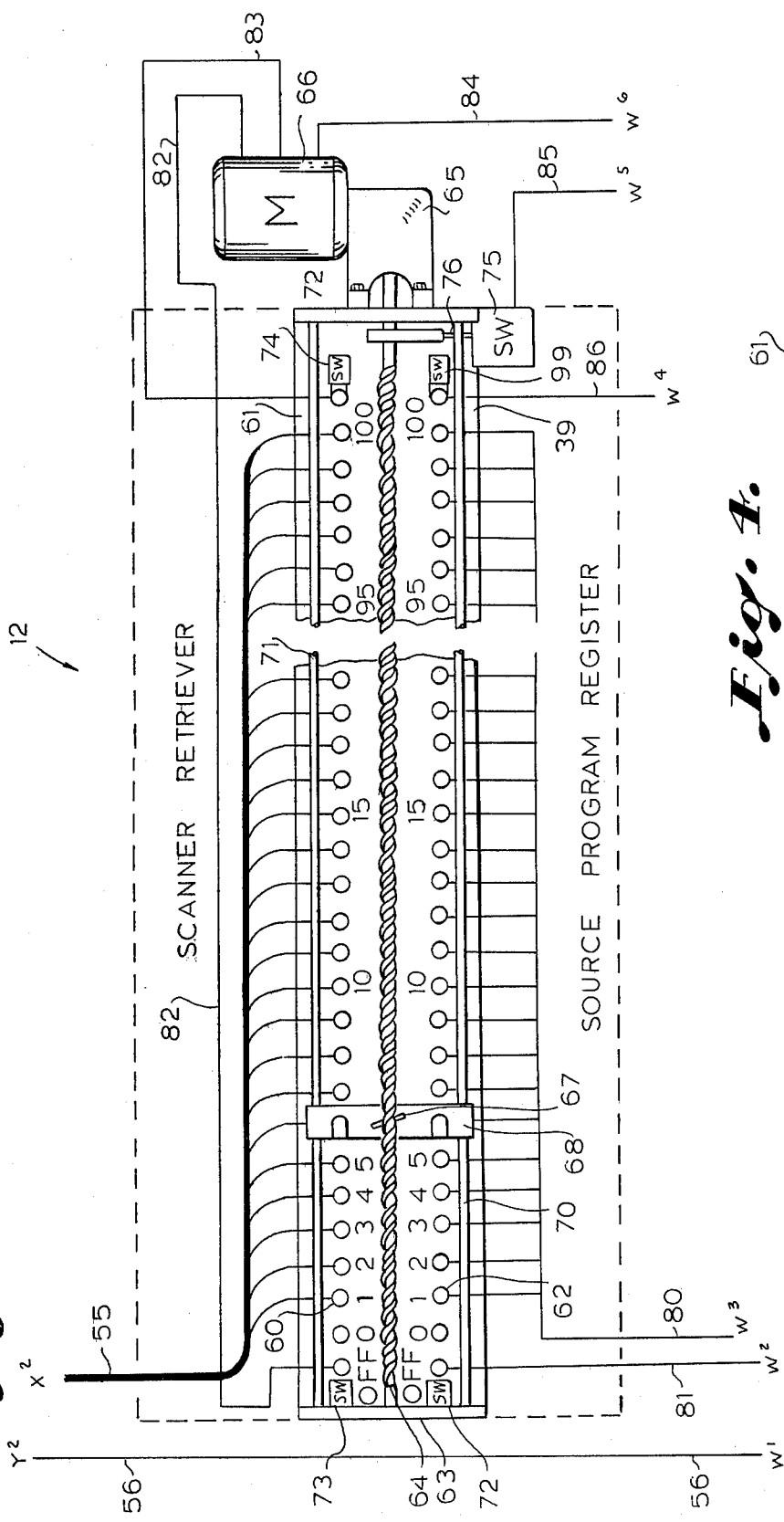
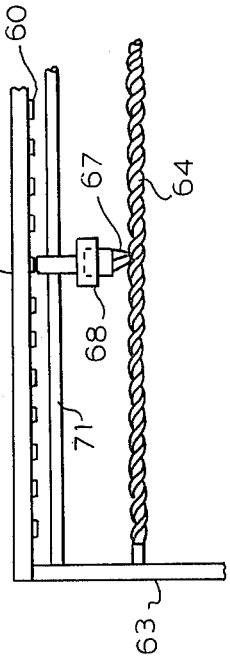

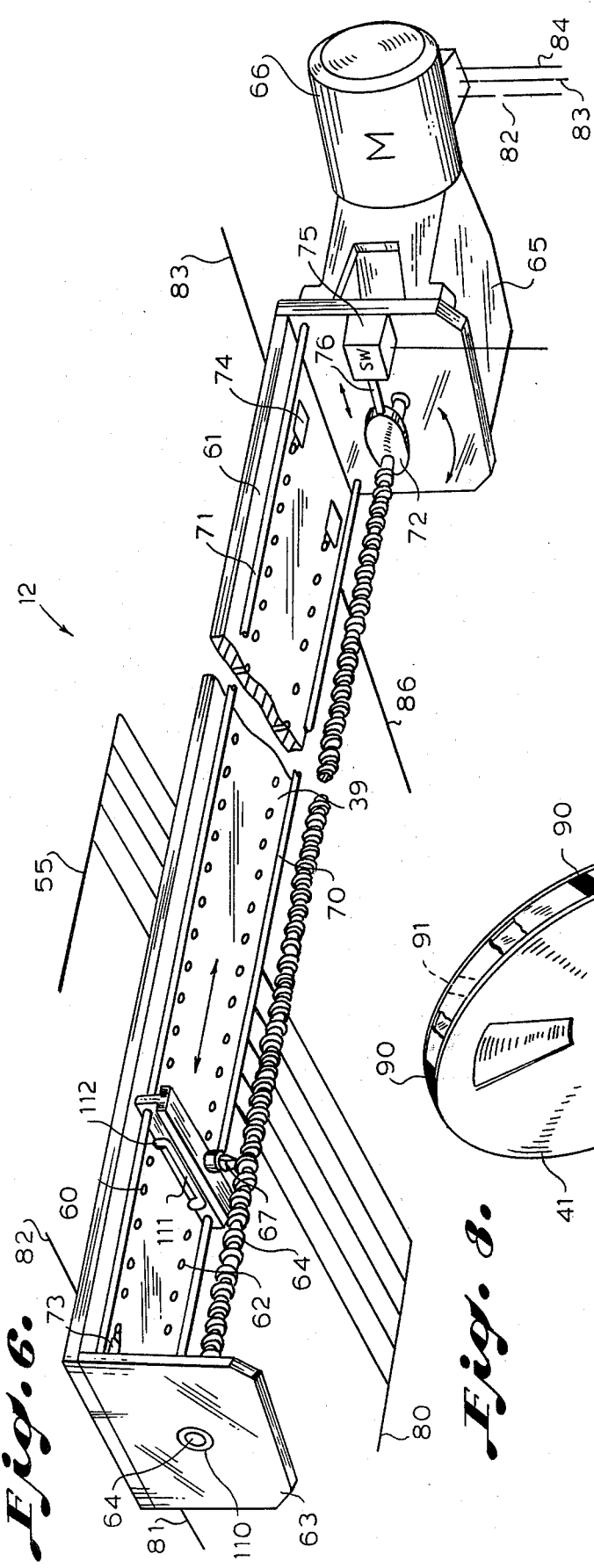
*Fig. 6.*
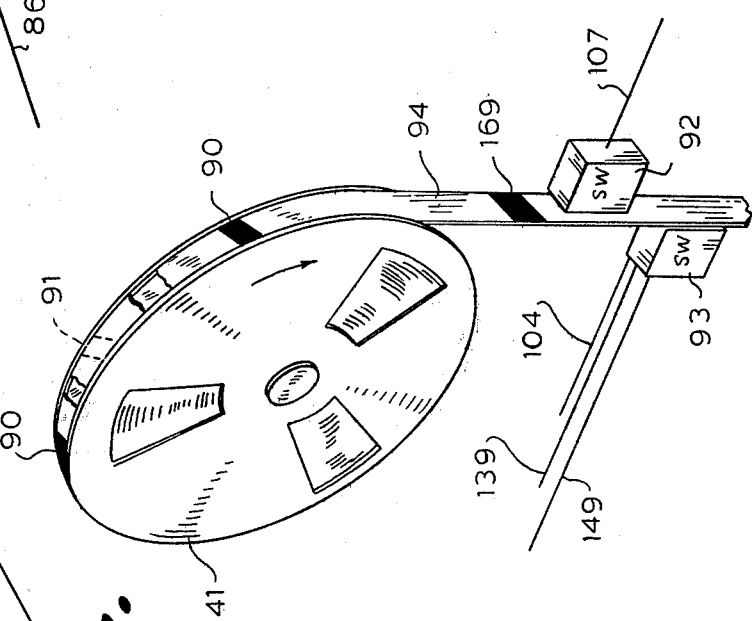
*Fig. 7.*
*Fig. 8.*

TAPE RECORDING SYSTEM

BACKGROUND OF THE INVENTION

The present invention relates to tape recording systems and specifically to a system for reproducing only selected pieces of recorded material and recording the selected pieces for the production of a custom recording having only requested recorded material thereon.

In the past, it has been common to have a great variety of reproducing and recording equipment which is frequently combined. Typical recording equipment includes recording discs or records, wire recorders and magnetic tape recorders. The present invention is directed primarily to magnetic tape recorders and specifically to ways of reproducing customized, pre-recorded tapes. It has also been common in the past to provide means for feeding a plurality of pre-recorded tapes or records in a selected order for reproduction in that order and there has also been provided machines for selecting a predetermined recording for reproduction. Generally, however, pre-recorded eight track tapes or tape cassettes or even long playing records are mass produced with a variety of recorded pieces thereon for sale through retail outlets. The consumer is generally faced with the decision of buying the tapes or records when frequently he is interested only in a few or maybe one of a selected piece on the recording. This increases his cost for obtaining a selected piece and requires him to listen to the selected recordings which he has no desire to listen to. The present invention, on the other hand, would allow a consumer to order a custom tape of selected pieces from a large bank or selection which is then programmed into the present apparatus to produce a custom tape with only the pieces the customer desires to have on the tape. The present system is designed to be operated by a single individual and to be produced at a cost where it can be sold or used in any large metropolitan area as well as through mail order sales.

SUMMARY OF THE INVENTION

The present invention is a tape reproducing and recording system having an input or selection means for indicating selections of predetermined recorded pieces of material from a bank having a plurality of pieces of recorded material. The selections made are stored in a memory which is scanned by a scanner which locates a selected piece in a bank of pre-recorded material located on a reproducing tape deck. The located material is then reproduced and recorded from a tape recorder coupled to the recording means for recording each selected recorded piece so that a recording can be made having only preselected pieces from the bank of prerecorded material thereon. The system can have monitors for monitoring the pieces being reproduced and recorded and can place the selected pieces in a selected order if desired.

BRIEF DESCRIPTION OF THE DRAWINGS

Other objects, features and advantages of the present invention will be apparent from the written description and the drawings in which:

FIG. 3 is a sectional view of the retrieval system;

FIG. 4 is a cut-away sectional view of the remainder of the apparatus;

FIG. 6 is a perspective view of the memory output and retrieval section;

FIG. 7 is a cut-away sectional view of the scanning member of the retrieval section; and FIG. 8 illustrates a perspective view of a pre-recorded tape having indexing tabs and pickups for reading the indexing tabs.

DESCRIPTION OF THE PREFERRED EMBODIMENT

Figure 1:
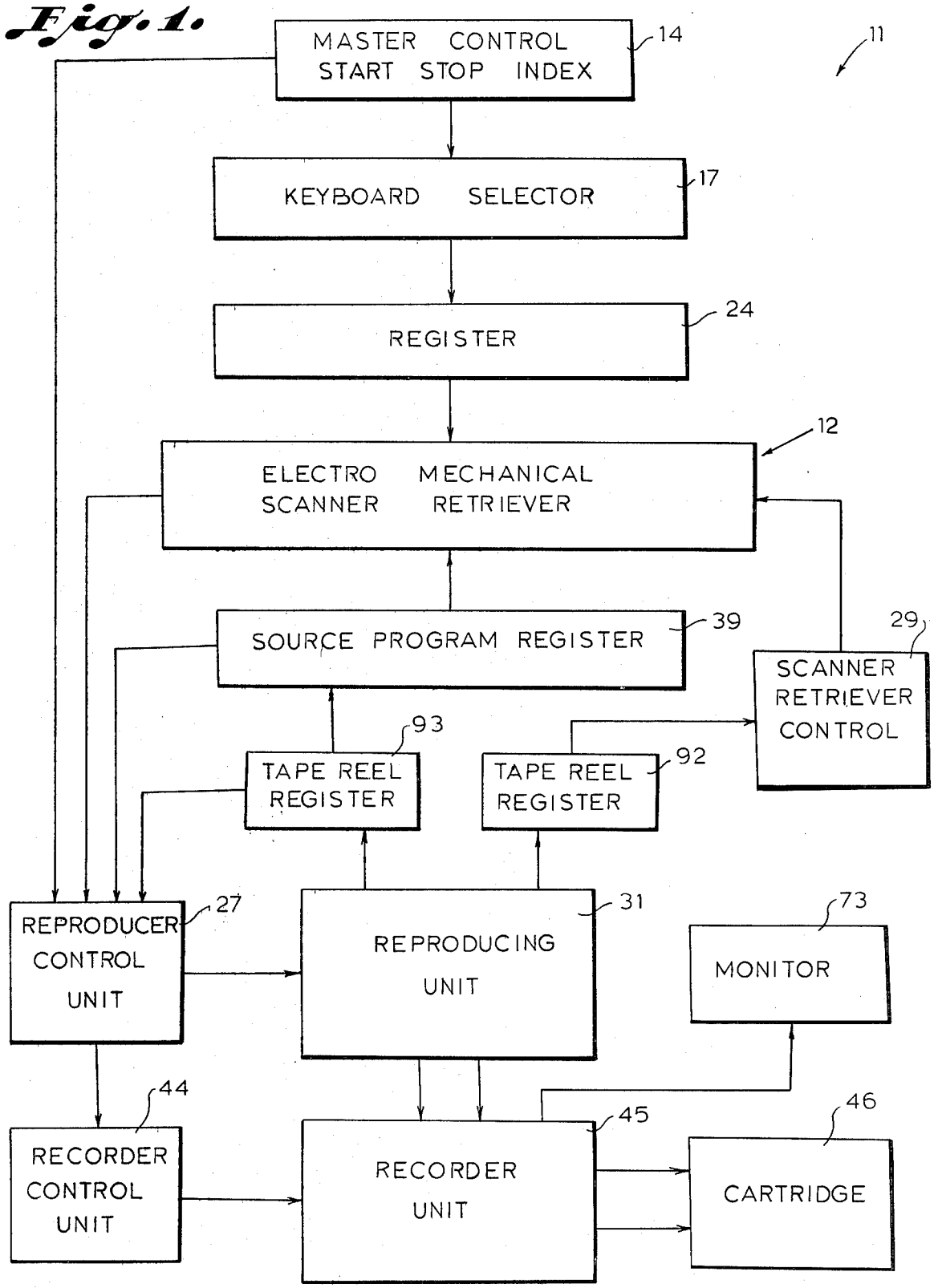
FIG. 1 is a block diagram of the apparatus in accordance with the present invention.

Referring to FIG. 1 of the drawings an overall block diagram of a retrieval and recording system 11 is illustrated having a master control 14 which is used to turn the apparatus on, start and stop the tape players and recorders and index a predetermined number of selected pieces of recorded material such as pre-recorded tunes. The master control 14 activates the keyboard selector 17 which with the master control is the input to the apparatus 11 and allows coding numbers to be selected, each coded number being indicative of one unit of recorded material. The keyboard selector 17 has a plurality of manually actuated switches which actuate silicon controlled rectifier switches in the register 24 which is a memory unit that stores the coded numbers indicative of selected tunes. The register energizes the electromechanical scanner 12 which works as a crossover switch to the source program register 39 which works in connection with a bank of recorded material 41 such as master tapes with a large number of preselected tunes recorded thereon in a predetermined order each one having a coded number and being capable of being scanned by the scanner 12 for stopping the pre-recorded material on a particular tune and then playing that tune for recording on a blank tape on a tape recorder. Tape reel registers 92 and 93 are used to identify the position of the recorded material 41 by reading marked points on the tape.

The tape reel registers 92 and 93 produce the signals and actuate the tape reproducer and tape player and hold the electromechanical scanner retriever 12 until a particular recording is completed. The holding is through the feedback scanner retriever control unit 29, connected from the tape reel register 92 to the electromechanical scanner retriever 12. The master control 14 is used to turn on the reproducing unit 31 through the reproducer control unit 27 which is, of course, connected to the reproducing unit 31 which also supplies power to the recording unit 45 through the recording unit controls 44 which is used to produce the final recording which may be a recorded tape 46. A monitor 73 may be speakers or headphones to monitor the reproduction from the reproducing unit 31 to assure that the unit is operative and is reproducing the programmed material.

Figure 2:
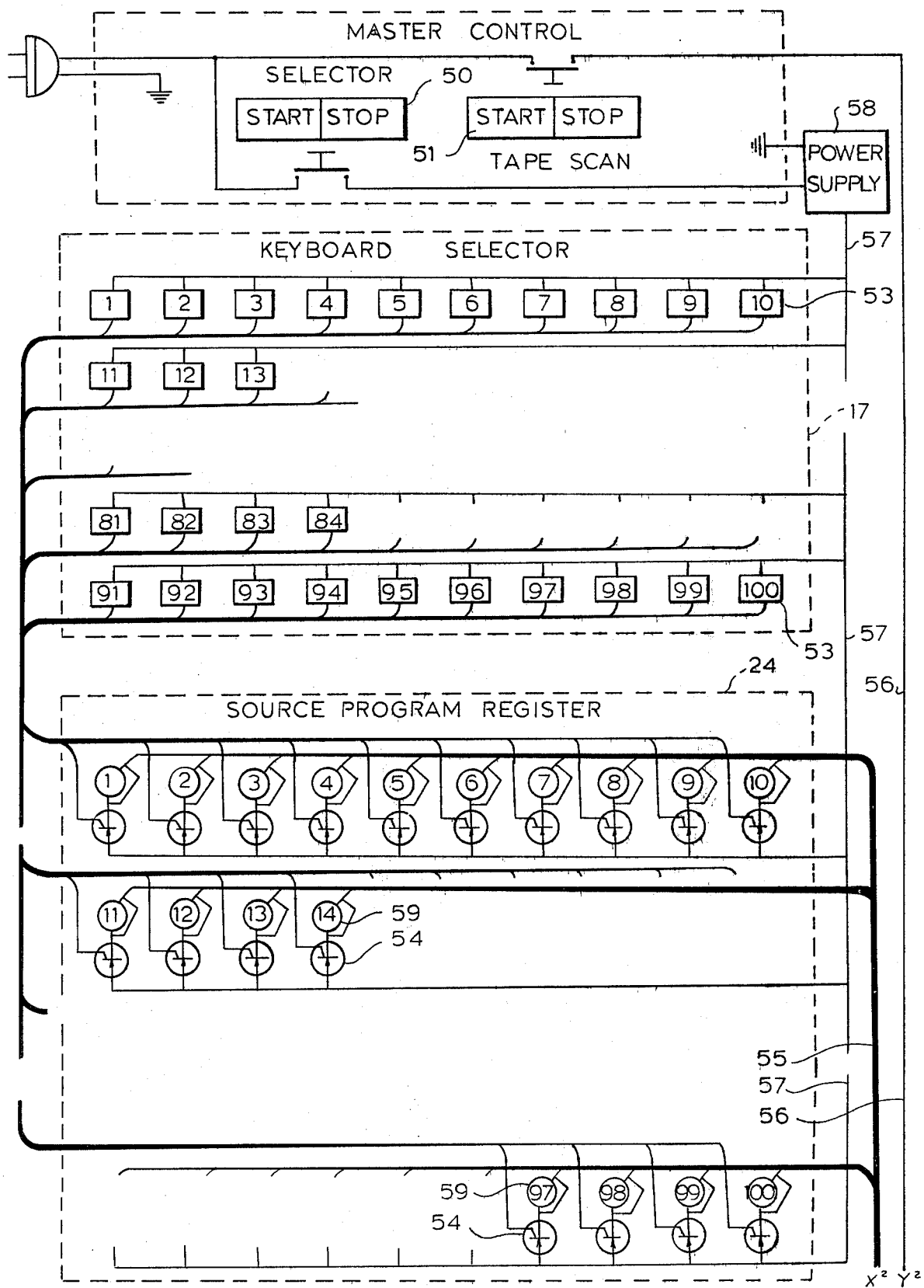
FIG. 2 is a schematic diagram of the selector and memory portion of the invention of FIG. 1.
Figure 5:
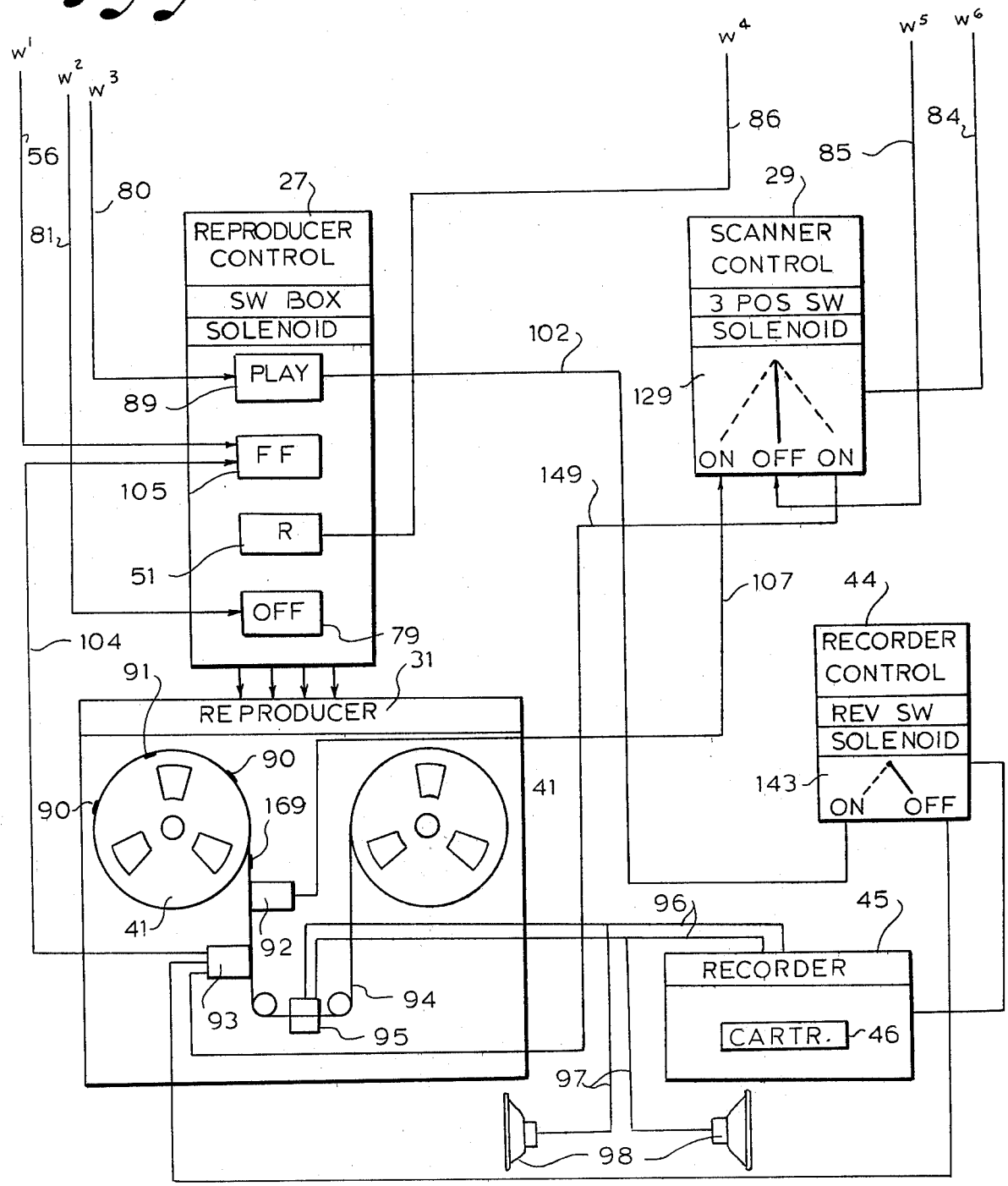
FIG. 5 is a diagramatic view of the reproduction and recording section of the present invention.

FIG. 2 illustrates the master control 14 and keyboard selector 17 while FIG. 3 illustrates the layout of the electromechanical scanner retriever 12 and FIG. 5 shows the layout of the remainder of the system with some additional details set forth in FIGS. 6, 7, and 8. FIG. 2 has the master control unit 14 separated by dash lines and including the selector actuating switch 50 along with the tape scan actuating switch 51 both connected from a 110 volt power source. A plurality of selectors 53 each having a number starting with 1 and going through 100, or more, are provided on a selector board. Each selector actuates a switch. A power supply 58 provides the low voltage to each selector switch 53 which low voltage is supplied from the selector unit 17 illustrated in dash lines to the register 24 illustrated in dash lines. The register 24 acts as a memory for the unit and each switch 53 is connected to a memory chip 54 which may be a silicon controlled rectifier gate (SCR) which applies a voltage thereacross and illuminates a numbered indicator light 59 and holds the line open until disengaged. An electromechanical relay may also be used with the memory chip 54 to obtain a higher voltage if desired by having the SCR hold the electromechanical relay to apply a higher voltage through the chip 54 and out of the trunk lines 55. The master control unit 14 also applies a voltage through a line 56 when the tape scan switch is actuated and through a line 57 when the selector switch is actuated, which selector switch provides the voltage through a power supply 58. The voltage from each memory chip 54 is applied to the electromechanical scanner retriever unit illustrated in FIGS. 3 and 4, as well as in FIGS. 6 and 7 through the trunk line 55 which applies a voltage to a plurality of electrical contacts 60 on the face 61 of the electromechanical scanner retriever 12. Each numbered electrical contact 60 has an equivalent or matching electrical contact 62 also on the board 61. The electromechanical scanner retriever 12 has a frame 63 having a rotating screw 64 mounted in a bushing at one end and through the frame at the other to a gear box 65 which is in turn connected to an electric motor 66. Electric motor 66 operates the gears in gear box 65 to produce a desired speed of rotation of the screw 64 which is operatively engaged by the screw engaging member 67 of the sliding retrieval member 68 which rides on a pair of bars 70 and 71 connected between the upright frame members 63. Thus, rotation of the screw 64 will move the thread engaging pawl 67 and thereby the selector bar 68 on the support bars 70 and 71. As the screw 64 rotates, it moves the bar 68 along the case 61 moving the contact member 71 along the contacts 60 and 62. Selector bar 68 is a conductor that contacts each contact member 61 and its equivalent contact member 62 and connects the two to form a passage for an electrical current so that if a voltage is being applied to one of the contacts 60 as a result of a selector 53 being pushed for a particular coded selection. The member 68 can also be stopped on that particular code number to apply a voltage therethrough for actuating the recording and reproducing system for a particular tune to be recorded. The scanner retriever system 12 is, of course, synchronized with the recording material in order to select the particular recording. The switching bar 68 has a pair of switches 73 to indicate the off position for shutting off the motor 66 to hold the bar 68 in a rest position. Once the motor is actuated, the bar switch 68 moves along the base 61 until a predetermined contact 60 which has a voltage applied thereto is reached, in which case, the bar 68 is stopped while the music source is reproduced and then continues to move until the next live contact 60 is reached. Switches 74 and 99 indicate that the bar 68 has travelled through all of the contact points 60 to the end of the cycle, at which time it is rapidly returned by reversing the motor 66 to the stop position on switch contact 72 and 73. Thus, once the selector has had all of the programmed recorded material selected, the recorder scanner retriever can be actuated to begin the recording in which case the bar 68 begins to move until the first actuated code number is reached which piece is reproduced and recorded and then the bar 68 continues until the next selected piece is reached, and so forth, until the entire selected recording material has been reproduced and recorded onto an individual tape. A cam switch 75 is actuated by switching plunger 76 riding as a cam follower on a cam 77 which is fixedly attached to the screw 64 and actuates the switch 75 for each rotation of the screw 64.

The scanner retrieval unit 12 has an output line 80 connected to each of the switch contacts 62 and output line 81 connected to the switch 72 for indicating the off position. Switch 73 is connected by a line 82 to the motor 66 for turning off the motor at a predetermined time which motor also has a line 83 connected to the switch 74 for switching the motor to reverse for returning the switching bar 60 to its beginning position. Line 84 is connected to the motor 66 for turning the motor on in a forward direction on command of a scanning control and a line 85 is connected from the scan switch 75 to the scanning unit while the output line 85 is connected to the scanner retriever control unit 29.

Referring more specifically to FIG. 5, the reproducing unit 31 is illustrated as a reel-to-reel tape recorder having a large source of material 41 attached thereto in the form of large tape reels, each tape having metal tabs 90 on one side and 91 on the opposite side, which tabs are read by switches 92 on one side and 93 on the opposite side. Switch 92 synchronizes material 41 with the scanner retriever 12 and also reads the beginning of each recorded piece while switch 93 locates the end of each recorded piece which are read with magnetic tape reading heads 92 and 93 to indicate the position of the tape 94 from the reels 41 on the reproducing unit 31. The recording is done through the recording head 95 of the reproducing unit 31. The recorder 45 is connected by lines 96 to the head of the reproducer 31 so that the recorder can reproduce directly from the head 95 onto blank tape cartridges 46 which may be an eight track tape cartridge. A pair of electrical lines 97 connected to a pair of speakers 98 can reproduce the amplified reproduced signals converting them into acoustic signals where they can be monitored as they are being recorded in the recorder 45. Each completed recorded tape 46 is removed from the recorder and delivered to the customer. The recorder 45 is actuated whenever the reproducing system 31 is reproducing from the recorded material 41 and is switched on by line 100 connecting into the recorder control 44 and is in turn switched through a line 102 from the player control box 27. Player control box 27 is also connected to the reproducer 31 and is connected through line 80 to the contacts 62 for actuating the play control switch 89 for actuating the reproducer 31 and recorder 45 and is connected through line 81 to the off switch 79 for switching the system off after the completion of the cycle. Line 56 is connected directly to the master control box for actuation of the start-stop of the tape and scanning controls while electrical conductor 104 is connected from the reproducing switch 93 to the fast forward switch 105 and to reproducer control 27 and produces the signal through switch 93 indicating the end of the first piece. The fast forward switch is actuated to continue searching the tapes for the next piece to be reproduced which is identified by the switching switch 92. The scanner retriever control box 29 operates through solenoid switches and is connected to the motor 66 through electrical line 84 for turning the motor 66 on upon actuation of the scanner retriever control 29. The line 85 is connected to the cam switch 75 connecting it to the scanner control 27 as is line 107 which is connected from switch 92 to indicate the start of a tune for actuating the scanner retriever control box 29. The scanner retriever control box 29 controls the operation of the motor 66, the screw 64, and thereby the moving switch bar 68 riding along the base 61 of FIG. 3 connecting the switching contacts 60 to those of 62 for starting and stopping in response to a SCR memory chip 54 controlling voltage when applied by previously depressing selected switches, or switch, in keyboard selector 17. When contact 62 has been actuated and has a voltage applied thereto, it actuates the reproducing unit 31 and turns off the motor through the scanner retriever control box 29 until the tune is completed. Starting, beginning, or ending a tune by switches 92 and 93 which read the metal tabs 90 and 91 to indicate the beginning and end of a tune while the cam switch 75 synchronizes the scanner control by counting the number of revolutions of the scanning screw 64.

Referring to FIGS. 6,7, and 8, the electromechanical scanner retriever 12 is more clearly illustrated in a perspective view having the frame members 63 having a bushing 110 supporting the end of the helix screw 64 with pawl 67 riding therein and attached to the contact bar 68 riding on the support bar guide members 70 and 71 and having the metal conductor portion 111 with contact tips 112 for contacting the electrical contacts 60 and 62. The motor 66 is illustrated operated by lines 83, 84 and 82 driving a gear box 65 for operating the screw 64. Cam switch 75 has the cam follower 76 riding on the cam 72 which is fixedly attached to the rotating screw 64. Input lines 55 and output lines 80 are also illustrated attached to the contact 60 and 62, as well as the switches 72 and 73 at one end and switches 74 and 99 at the opposite end thereof. The conductor bar 111 and contact points 112 riding on the switching bar 68 is more clearly illustrated in FIG. 7 while FIG. 8 illustrates the material in storage tape 41 having magnetic tape 94 thereon with metal tabs 90 on one side and 91 on the other which actuate magnetic pickup switches 92 and 93 for scanning the tape, locating particular recorded pieces and reading out the beginning and end of each recording reproduced by the reproducer 41.

Referring to all of the drawings, the operation is begun by an operator making a first selection on the keyboard selector 17 which registers on the scanner retriever 61 which would cause current to pass through the scanner switch bar 68 passing current through conductor 80 onto the play solenoid switch 89 in the tape player control box 27 thereby stopping the fast forward switch 105. The play switch 89 is connected by conductor 102 to the recorder control switch 143 on the recorder control box 44 and through conductor 100 for turning the recorder 45 on and recording the selection from the reel-to-reel player tape 41 being played on the reel-to-reel player 31 on a blank tape 46.

At the conclusion of the first selection, the bottom tab 91 passes over register switch 93 connected by a conductor 139 to stop position of recorded control switch 143 in the recorder control box 44 cutting the recorder off. Switch 93 is also connected by conductor 149 to the scan motor switch 129 in scan control box 29 starting the scan motor to move worm gear 64 causing the scan switch bar 68 to move until the cam operated switch 75 moves one rotation to the second digit, stopping the motor through conductor 85. Register switch 93 is also connected by conductor 104 to dast forward switch 105 in tape player control box 27 starting the tape in fast forward to the next start metal top tab 90 on the tape, passes over tape register switch 92 connected by conductor 107 to scanner control switch 129, re-starting scan motor 66, worm gear 64 and cam 72. The cam plunger switch 75 then stops the scanner switch bar after one more rotation.

If a selection is in the memory face 61 operation repeats recording the next selection. If the next contact 60 has not been selected and has no voltage applied thereto, the tape play switch 89 would not be energized as no current would pass through the scanner switch bar 68 onto the source program register 39 to energize through connector 80 the play switch 89 of the tape player control box 27. The reel-to-reel tape 41 will continue in a fast forward mode past the end bottom tab 91 passing over register switch 93 connected by connector 104 to fast forward switch 105 already in the fast forward position and the tape would continue in a fast forward mode until the next tab 169 passes over register 92, causing switch 129 to turn on and starting scan motor 66 to start worm gear 64 and worm gear cam 72 to the next digit. Each rotation of the gear 64 is thereby synchronized with the reel-to-reel tape position.

This start-stop-start motion of the system continues completely synchronized until the scanner bar 68 gets to the reverse switch contact 74 and 99 on the face member 61 thereby reversing scan motor 66 on the scanner retriever base 61. Contact 99 is connected by conductor 86 to the tape reverse switch 51 in the player control box 27 causing the tape player to also reverse. This reverses the entire operation with the exception that the memory write-in face 61 has nothing therein and the play switch 89 of player control box 27 is never energized. Accordingly, there is no interruption in the start-stop-start cadence of the mechanism in reverse until the scanner bar 68 reaches off switch 73 in memory write-in face 61 through conductor 82 stopping scan motor 66 and off switch 72 through conductor 81 to "off" switch 79 on the tape control box 27 stopping tape player 31 and tape 41.

This system operates as described by the scanner sliding retriever member 68 of FIG. 3 starting at the beginning and shifting from one set of contacts 60 and 62 to the next. Each revolution of the scanning screw 64 moves the scanning bar 68 from one contact 62 to the next and thereupon rotates the cam 72 which actuates switch 75 and turns off the motor 66 with each cycle. Each time a voltage has been applied from the selector to one of the contacts 60 it then applies a voltage across the scanning bar 68 to the opposite contact 62, thereby actuating the play solenoid 89 through line 80 and starts the reproducer 31 of FIG. 5 operating. The control 27 is a standard control used with tape recorders except that it has been modified so that when the play switch 89 is actuated, it actuates through line 102 of the recorder 45 so that anytime the reproducer 31 is reproducing the recorder 45 is recording. Once all the selections have been made into the keyboard selector in FIG. 2, the master switch through line 56 turns on the fast forward which has the reproducer 31 running at fast forward until the play 89 is actuated at which time it slows down to playing speed. The scanning bar 68 of the scanner stops at each pair of contacts but is restarted by either the pick-ups 92 or 93 turning the scanner control 29 switch from off to on at which time the scanning motor runs the scanning bar 68 to the next set of contacts where it stops and waits for the tape on the reproducer 31 to reactuate it by the pick-ups 92 or 93. Thus, once started, the reproducer continues either at fast forward or play until the complete recording is completed. While the scanning bar 68 stops at each pair of contacts and waits to be turned on again by the scanner control 29, which may be almost immediate when the reproducer is in fast forward position or may have to wait for a longer period of time when the reproducer 31 is in a play position. The synchronization is not by the synchronizing of the speeds of motor 66 and the movement of the tapes on the reproducer 31, but rather by the actuation of the scanner in steps by the reproducer 31 so that the bar 68 riding on the drive screw 64 must always move at least as fast as the fastest fast forward motion of the tape on 31 between tabs.

It should be clear at this point that a system has been provided for the production of customized tapes by special order which has a programmed input through selection codes and allows an individual to insert a series of material which is on master tapes and in which the apparatus will automatically locate the recorded pieces, reproduce them and record them on blank magnetic tapes. It should be clear, however, that the invention is not intended to be limited to the specific forms disclosed herein since improvements and changes are anticipated. For instance, it can be anticipated that integrated circuit memory units can replace individual SCR and relay memories and that improved electronic scanning can be provided for the scanner retrieval without departing from the spirit and scope of the invention. However, in the present form, many of the components are commercially available for different purposes but readily available for use in the present invention. Accordingly, this invention is not to be construed as limited to the particular forms disclosed herein since these are to be regarded as illustrative rather than restrictive.

I claim:

1. A tape recording system comprising in combination:
    input means for indicating selections of predetermined pieces of recorded material from a bank of recorded material;
    memory means for storing said selections from said input means;
    reproducing means having a blank of pre-recorded material located thereon in a predetermined sequence;
    scanning means coupled to said input means memory means and to said reproducing means for locating each selected recording piece from said pre-recorded material located on said reproducing means for reproduction by said reproducing means responsive to selections made in said input means, said scanning means scanning through a predetermined cycle to retrieve each selected piece and returning to a rest position, said scanning means being an electromechanical scanner retriever having a moving member scanning a plurality of contacts and selecting each contact having a voltage thereon;
    recording means coupled to said reproducing means for recording each selected recorded piece played by said reproducing means;
    control means coupled between said scanning means and said reproducing means for controlling said recording and reproducing means responsive to said scanning means reaching a selected piece to be recorded whereby a recording can be made having only preselected pieces from a bank of pre-recorded material; and
    a monitor operatively connected to said reproducing means for reproducing the material being recorded during the recording.

2. The apparatus in accordance with claim 1, in which said reproducing means reproduces from a bank of recorded material on magnetic tape and said recording means records upon blank magnetic tapes.

3. The apparatus in accordance with claim 2, in which said memory means includes a bank of silicon control rectifier switches, each activated by the selection being made by the input means.

4. The apparatus in accordance with claim 3, in which said input means is a plurality of depressibly actuated switches actuating a silicon control rectifier switch.

5. The apparatus in accordance with claim 4, in which a power supply provides a predetermined voltage to the input means switches and to the silicon control rectifiers.

6. The apparatus in accordance with claim 5, in which the magnetic tape of said bank of recorded material has markings thereon and said reproducing means includes a magnetic pickup for reading said markings for locating the beginning and end of each piece of recorded material.

7. The apparatus in accordance with claim 6, in which said markings on said pre-recorded material are metal index tabs.

* * * * *